(12) United States Patent
Brice

(10) Patent No.: US 12,161,105 B2
(45) Date of Patent: Dec. 10, 2024

(54) ANIMAL SNARE

(71) Applicant: Edward John Brice, Emerald Isle, NC (US)

(72) Inventor: Edward John Brice, Emerald Isle, NC (US)

(*) Notice: Subject to any disclaimer, the term of this patent is extended or adjusted under 35 U.S.C. 154(b) by 506 days.

(21) Appl. No.: 17/355,486

(22) Filed: Jun. 23, 2021

(65) Prior Publication Data

US 2022/0408694 A1   Dec. 29, 2022

(51) Int. Cl.
*A01M 23/34*   (2006.01)

(52) U.S. Cl.
CPC .................................. *A01M 23/34* (2013.01)

(58) Field of Classification Search
CPC .............................. A01M 23/34; A01K 15/003
USPC ........... 43/85, 86, 87; 294/132, 133, 1.5, 3.6
See application file for complete search history.

(56) References Cited

U.S. PATENT DOCUMENTS

| | | | |
|---|---|---|---|
| 235,675 A * | 12/1880 | Ewing | |
| 3,540,769 A | 11/1970 | Rosser | |
| 3,949,514 A * | 4/1976 | Ramsey | A01K 15/003 |
| | | | 43/87 |
| 3,967,408 A * | 7/1976 | Aberg | A01M 23/24 |
| | | | 43/87 |
| 4,179,837 A * | 12/1979 | Gummeringer | A01M 23/34 |
| | | | 43/87 |
| 4,208,827 A * | 6/1980 | Starkey | A01M 23/34 |
| | | | 43/87 |
| 4,506,472 A | 3/1985 | Barman | |
| 5,479,739 A | 1/1996 | Livingston | |
| 5,548,917 A | 8/1996 | Holwadel | |
| 5,595,166 A * | 1/1997 | Schmidt, III | A01K 81/00 |
| | | | 124/20.3 |
| 5,904,132 A * | 5/1999 | Biller | A01K 81/00 |
| | | | 124/20.3 |

(Continued)

FOREIGN PATENT DOCUMENTS

| | | | |
|---|---|---|---|
| AU | 596944 B3 | 4/1990 | |
| FR | 2812187 A1 * | 2/2002 | ........... A01K 15/003 |

(Continued)

OTHER PUBLICATIONS

Machine_Translation_GB-2436276-A (Year: 2007).*
Machine_Translation_KR-20200141695-A (Year: 2020).*
Machine_Translation_FR-2812187-A1 (Year: 2002).*

*Primary Examiner* — Darren W Ark
*Assistant Examiner* — Sahar Almatrahi
(74) *Attorney, Agent, or Firm* — Brooks Kushman P.C.

(57) ABSTRACT

An animal snare includes an elongated barrel and first and second carriages slidably supported on the barrel. The first and second carriages are interconnected by a cord. A snare extends out the first end of the barrel and has at least one end affixed to the second carriage. An elastic member is releasably connected to the first carriage and is configured to bias the first carriage toward a fired position. The elastic member is in tension when the first carriage is in a cocked position. A trigger assembly is configured to retain the first carriage in the cocked position against the tension of the elastic member. Actuation of the trigger assembly causes release of the first carriage and permits the first carriage to travel along the barrel toward the first end to the fired position as the tension in the elastic member is released to draw the snare.

20 Claims, 11 Drawing Sheets

(56) References Cited

U.S. PATENT DOCUMENTS

| | | | |
|---|---|---|---|
| D450,801 S | 11/2001 | Fundak | |
| 6,343,693 B1 * | 2/2002 | Finley | A45F 5/021 |
| | | | 24/336 |
| 7,121,038 B1 | 10/2006 | Smith | |
| 9,220,246 B1 | 12/2015 | Roman | |
| 9,719,749 B1 * | 8/2017 | Prior | F41B 3/005 |
| 2008/0060251 A1 * | 3/2008 | Morris | A01K 97/11 |
| | | | 43/21.2 |
| 2010/0146838 A1 | 6/2010 | Contreras | |
| 2010/0201141 A1 * | 8/2010 | Wright | B63B 21/54 |
| | | | 294/191 |

FOREIGN PATENT DOCUMENTS

| | | | | |
|---|---|---|---|---|
| GB | 2436276 A | * | 9/2007 | A01K 15/003 |
| KR | 20200141695 A | * | 12/2020 | A01M 23/34 |

* cited by examiner

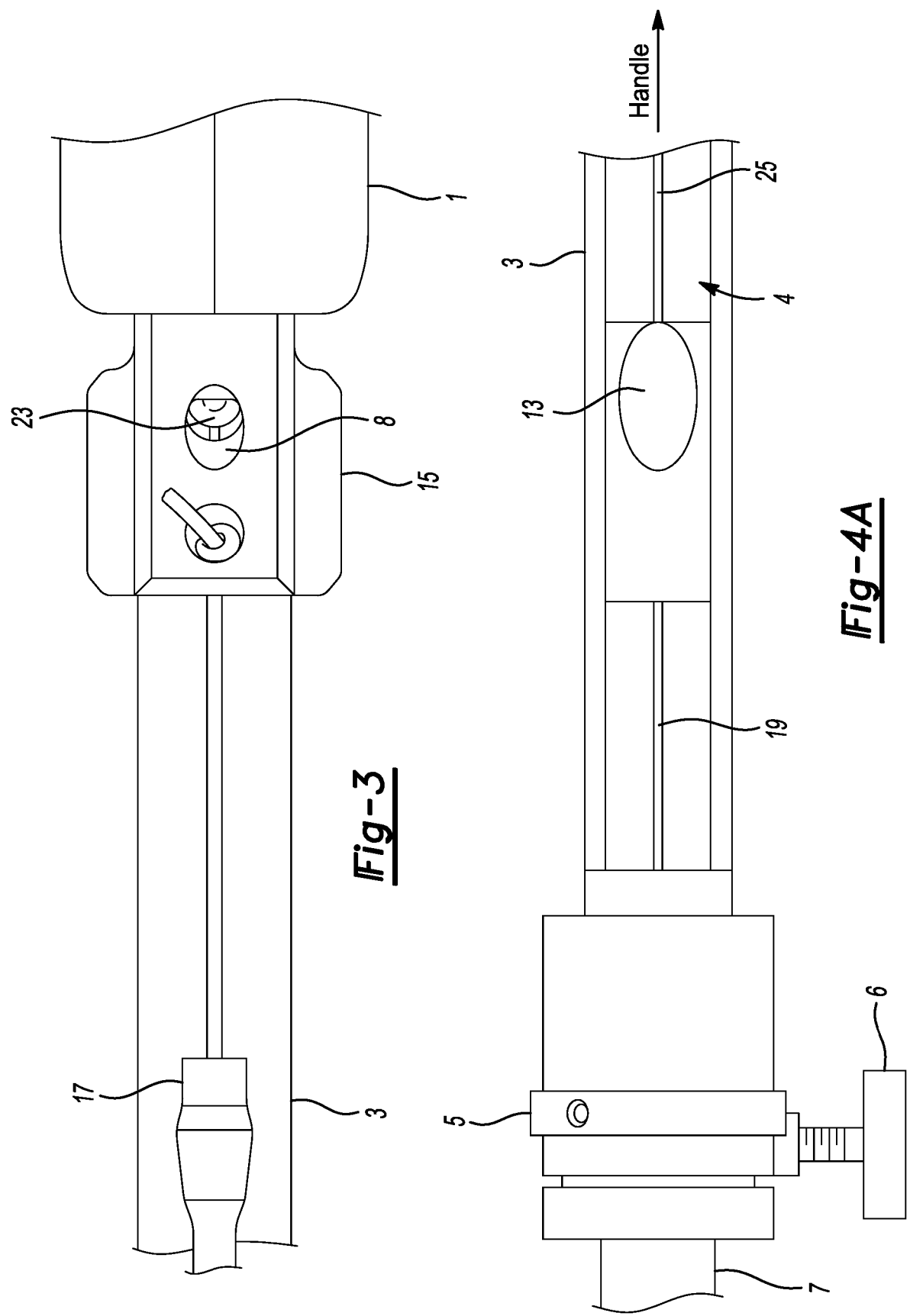

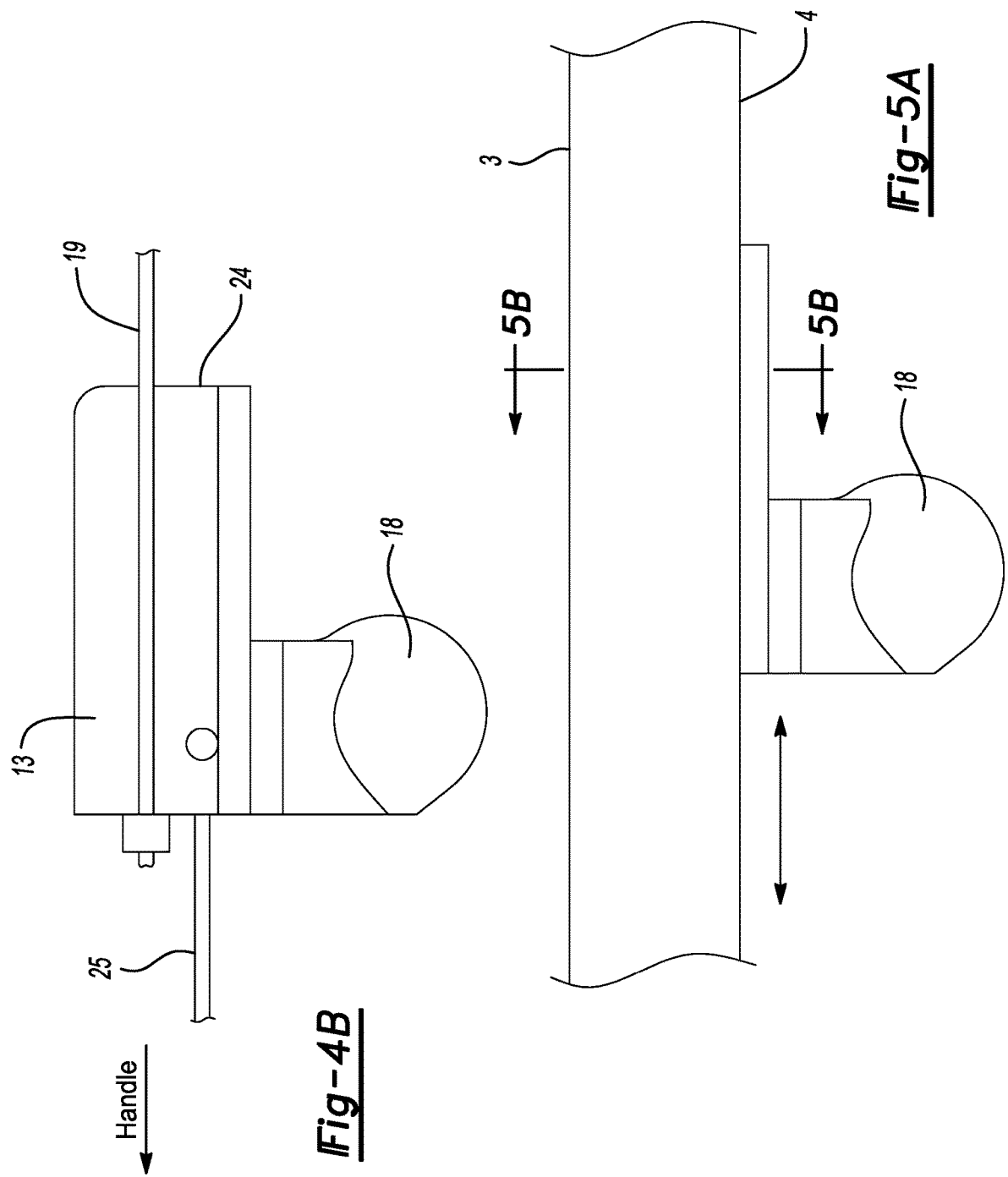

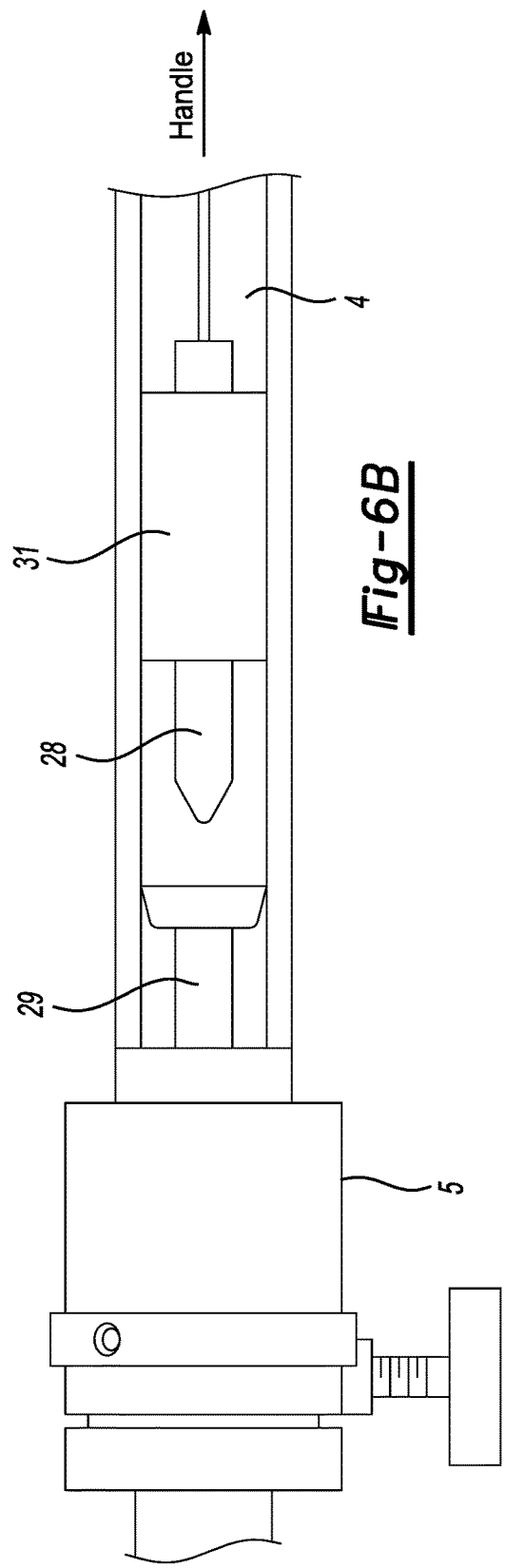
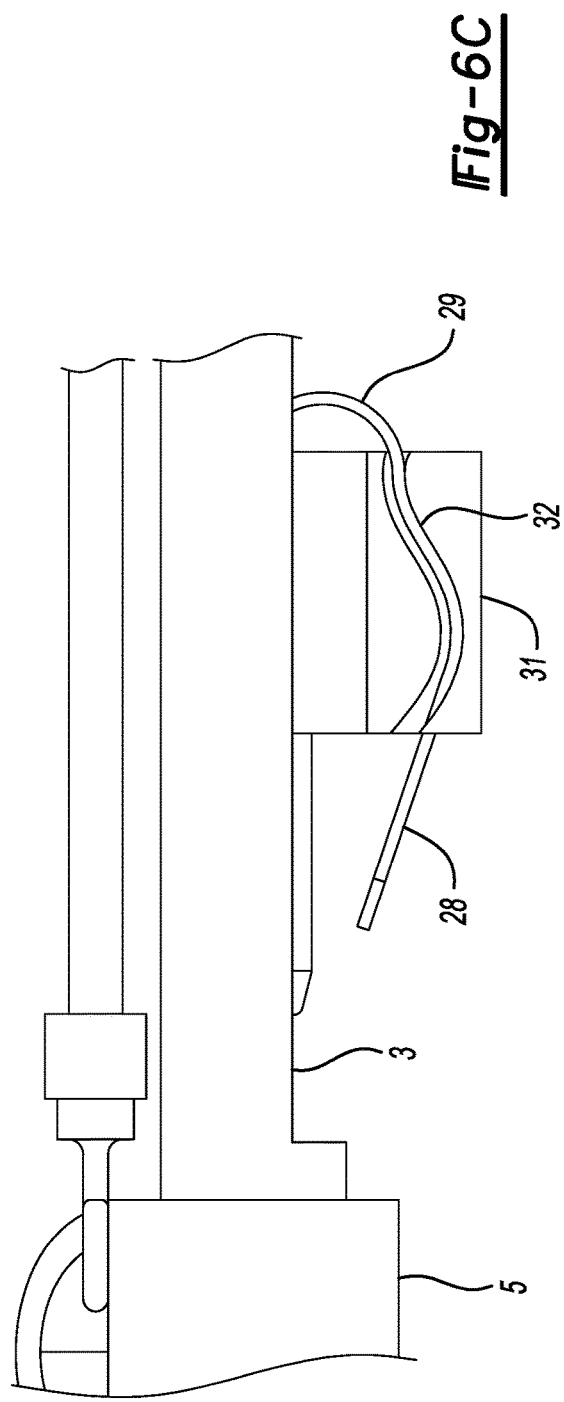

ANIMAL SNARE

TECHNICAL FIELD

Embodiments of the present invention relate to devices for snaring animals including lobster, fish, game and other animals.

BACKGROUND

In their natural habitat, lobsters often reside in lairs that are crevices, small caverns in coral, rock formations, or any other object that affords them protection. These locations have limited access and make harvesting very difficult. In addition, lobsters may be found on the floor or walls of their lairs. Their bodies may be positioned horizontally, vertically, or anywhere in between, and the lobsters swim backwards to elude capture.

Conventional lobster snares typically have limited adjustability and often require two-handed operation. These drawbacks reduce the overall effectiveness of the devices at harvesting lobster. Conventional snares require an opening large enough to allow a diver donning bulky dive gear sufficient access to the lobster to operate the snare. Two-handed operation of conventional snares limits the diver's ability to reach far enough into the lair to snare lobsters positioned farther back from the entrance. And when using such devices, the diver does not have a free hand to help maintain position in such tight spaces and manage buoyancy control. Conventional trigger operated snares generally require that the prey need be dispatched prior to release of the snare, or if aquatic prey, released far enough away from the water to prevent the prey from returning back to the water and escaping. In addition, traditional snare devices typically lack an effective way to control and release tension on the snare cable after a lobster has been snared. This risks loss of the lobster during harvest.

Conventional lobster snare devices are typically fixed in their position and lack adjustability for articulating the snare relative to the handle or trigger. Thus, any necessary adjustments in the position of a conventional snare must be made by maneuvering the entire snare assembly. Because the entrance of the lobster's lair is typically a small and confined space, the diver's ability to adequately position the snare for a successful harvest is often limited.

What is needed is a snare gun for harvesting lobster and other animals that has an adjustable articulating construction, and that enables one-handed operation for optimum snare positioning.

SUMMARY

According to one embodiment, an animal snare includes an elongated barrel having a first end, a second end, an outer surface, and an inner surface. A first carriage is slidably engaged on the outer surface of the barrel and is configured to travel along at least a portion of the barrel between a cocked position and a fired position. A second carriage is slidably retained within the inner surface of the barrel and configured to travel along at least a portion of the barrel. A pulley is positioned distal to the second end of the barrel. A cord has a first end affixed to the first carriage, a second end affixed to the second carriage, and a portion disposed around the pulley. A snare extends out the first end of the barrel and has at least one end affixed to the second carriage. An elastic member is releasably connected to the first carriage and is configured to bias the first carriage toward the fired position. The elastic member is in tension when the first carriage is in the cocked position. A trigger assembly is configured to retain the first carriage in the cocked position against the tension of the elastic member. Actuation of a trigger of the trigger assembly causes release of the first carriage and permits the first carriage to travel along the barrel toward the first end to the fired position as the tension in the elastic member is released.

According to another embodiment, an animal snare includes an elongated first barrel portion having a first end and a second end, an outer surface and an inner surface and an axis from the first end to the second end. A first carriage is slidably engaged on the outer surface of the first barrel portion. The first carriage is configured to travel along at least a portion of the first barrel axis. A second carriage is slidably retained within the inner surface of the first barrel portion and is configured to travel along at least a portion of the first barrel axis. A cord has a first end affixed to the first carriage and a second end affixed to the second carriage. At least a portion of the cord is disposed around a pulley. A curved second barrel portion has a first end and a second end, wherein the second end of the curved second barrel portion is affixed to the first end of the elongated first barrel portion. A snare extends out the first end of the curved second barrel portion and has at least one end affixed to the second carriage. An elastic member is releasably connected to the first carriage that, when stretched toward the second end of the first barrel portion, pulls the first carriage toward the first end of the first barrel portion. A trigger is configured to retain the first carriage along the first barrel portion with the elastic member in a stretched condition such that activation of the trigger permits the first carriage to travel along the first barrel portion toward the first end as tension in the elastic band is released.

BRIEF DESCRIPTION OF THE DRAWINGS

FIG. 3 illustrates an embodiment of a firing carriage assembly in an unfired position;

FIG. 4A illustrates an embodiment of a cable snare carriage in an unfired position within the snare gun assembly;

FIG. 4B illustrates an embodiment of a cable snare carriage removed from the snare gun assembly;

FIGS. 5A-5C illustrate the snare carriage and a cross-section of the eccentric cam of the cable snare carriage within the primary barrel;

FIG. 6B illustrates an embodiment of a zip tie carriage in an unfired position within the snare gun assembly;

FIG. 6C illustrates a side-vide of a zip tie carriage in an unfired position within the snare gun assembly;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
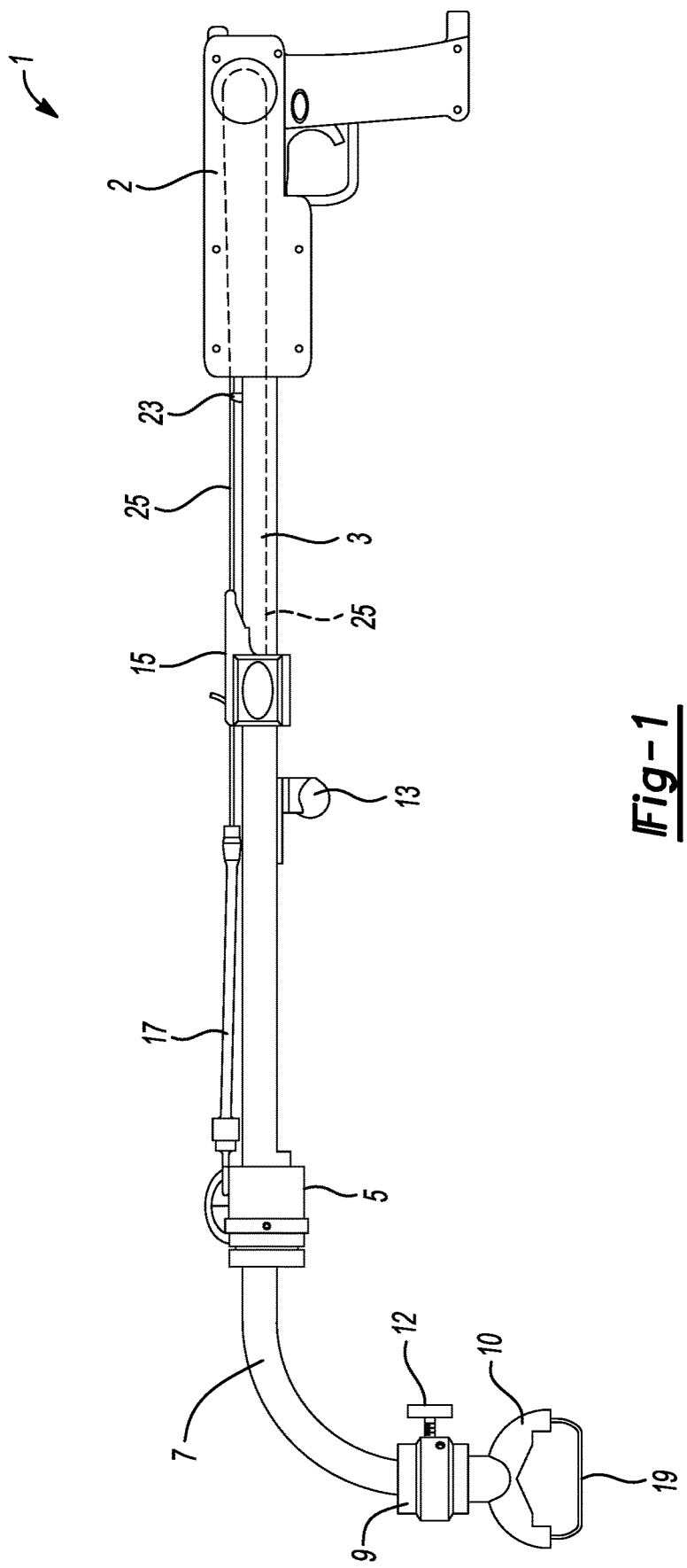
FIG. 1 illustrates an embodiment of a cable snare gun in a fired position.

FIG. 1 illustrates an exemplary embodiment of a snare gun assembly 1. The assembly includes handle assembly 2, trigger release pin 23, primary barrel assembly 3, adjustable barrel coupling 5, articulated secondary barrel assembly 7, snare coupling 9, snare frame 10, snare loop 19, snare carriage 13, firing carriage 15, elastic band 17, and transfer cord 25.

Figure 2A:
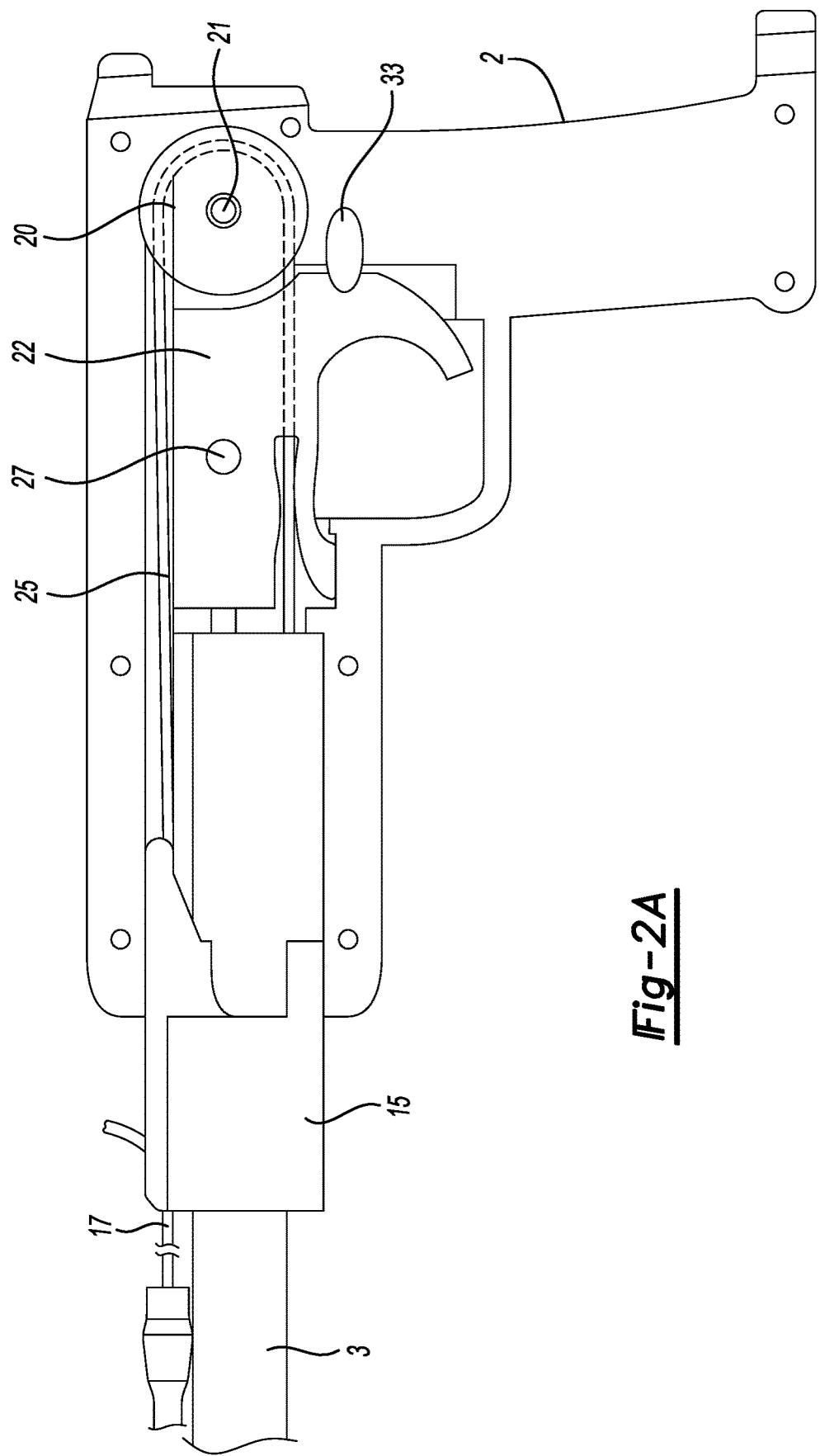
FIG. 2A illustrates an embodiment of a handle and trigger assembly partially disassembled and in an unfired (cocked) position.
Figure 2B:
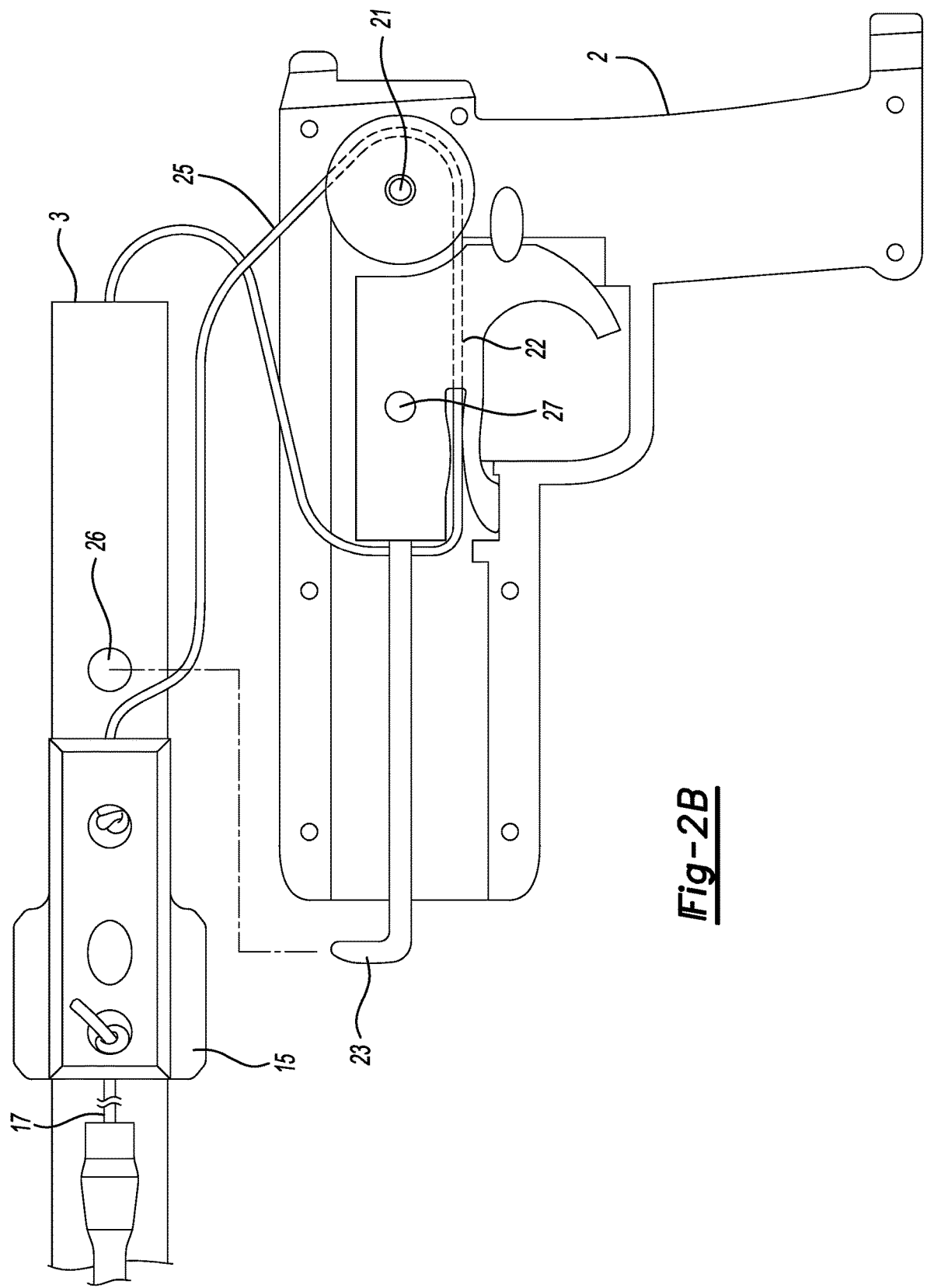
FIG. 2B illustrates the handle and trigger assembly of FIG. 2a partially disassembled.

FIGS. 2A and 2B are cut-away drawings illustrating an exemplary embodiment of the handle assembly 2 in greater detail. In this embodiment, the handle assembly in FIGS. 2A and 2B is depicted in a "pistol" configuration with a handgrip and trigger generally orthogonal to the barrel assembly. Other handle configurations may be implemented including but not limited to a linear handle design that is more coaxial with the barrel assembly. The trigger may be implemented in a variety of different configurations including but not limited to a push-button or other latching/unlatching configuration to release firing carriage 15.

As shown in FIGS. 2A and 2B, the trigger assembly may include a trigger 22, trigger pivot shaft 27, and latching arm 23. In this embodiment, the handle assembly 2 also includes a pulley 20 mounted rotatably upon pully shaft 21 for actuating transfer cord 25 between the firing carriage 15 and the snare carriage 13. Trigger assembly may also include a releasable safety stop 33, configured to prevent operation of the trigger 22 when activated by the user. In this example, pressing safety button 33 prevents the trigger 22 from rotating about pivot shaft 27, therefore preventing latching arm 23 from releasing firing carriage 15. Other safety stop and release configurations may be implemented. In another embodiment, for example, the safety stop could be integrated within firing carriage 15, releasably latching the firing carriage to the primary barrel 3. As shown in FIG. 2B, the latching arm 23 protrudes through the primary barrel 3 to retain, and release, firing carriage 15. Other trigger and carriage release mechanisms may be implemented.

FIG. 3 illustrates the firing carriage 15 in more detail. Firing carriage 15 is affixed to elastic member 17 that is biased to a contracted state and is axially stretchable to an extended state. The elastic member may be an elastic cord (as illustrated), a spring, or the like. For example, the elastic cord 17 may include a variety of materials and configurations such as a rubber band(s), a bungee cord(s), etc. The elastic member 17 provides the energy required to rapidly close the snare loop and maintains constant pressure on the snare loop once the trigger is fired.

The elastic member 17 extends linearly along the outside of primary barrel 3 between the firing carriage 15 and the adjustable barrel coupling 5. The elastic member 17 is stretched when in the unfired or "loaded" or "cocked" condition shown in FIG. 3 and is at rest when in the fired condition shown in FIG. 1. Firing carriage 15 is releasably latched in the unfired condition by trigger latch 23. Release of the latch 23 from the firing carriage 15, via pulling of the trigger 22, results in rapid contraction of the elastic member 17 and draws the snare closed.

Figure 6A:
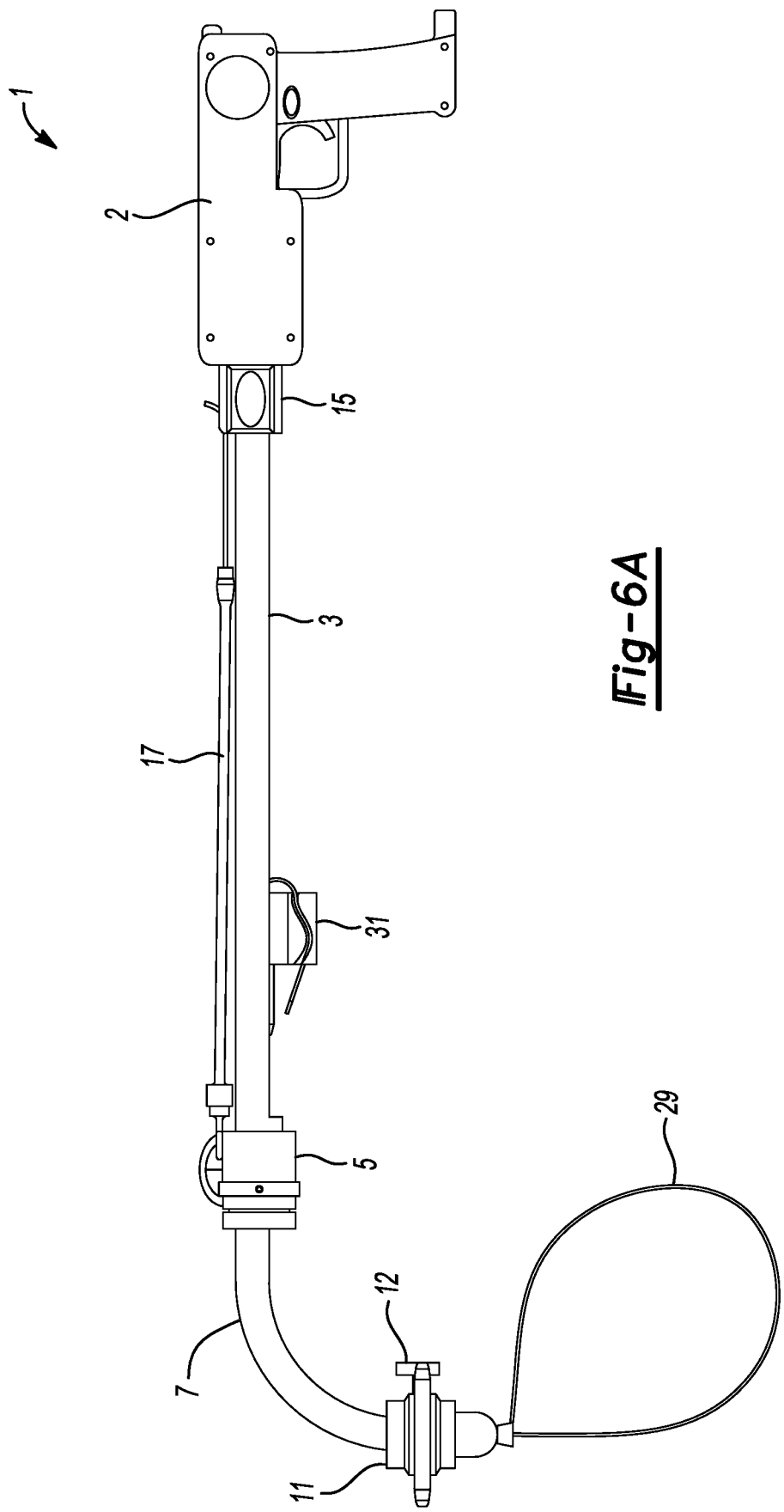
FIG. 6A illustrates an embodiment of a zip tie snare gun in an unfired position.

FIGS. 4A and 4B illustrate example embodiments of snare carriage 13. FIGS. 4A and 4B illustrate a snare carriage 13 for a cable snare 19 illustrated in FIG. 1. FIGS. 6B and 6C illustrate a snare carriage 31 for a removeable zip-tie snare 29 illustrated in FIG. 6A. As shown in FIGS. 4A and 4B, snare carriage 13 is affixed to the snare cable 19 and the transfer cord 25. In this example, snare carriage 13 travels linearly along a channel 4 defined within primary barrel 3, between the unfired position shown in FIG. 4a and the fired position shown in FIG. 1. Referring to FIG. 4B, snare carriage 13 includes a thumb tab 18 and carriage body 24.

Figure 5B:
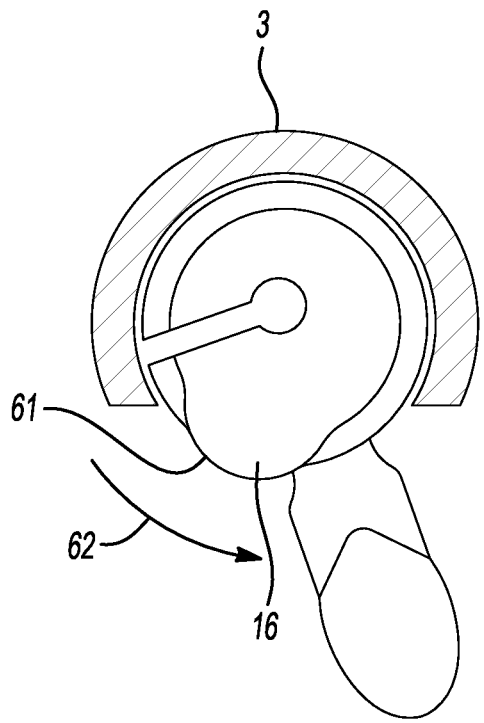
Figure 5C:
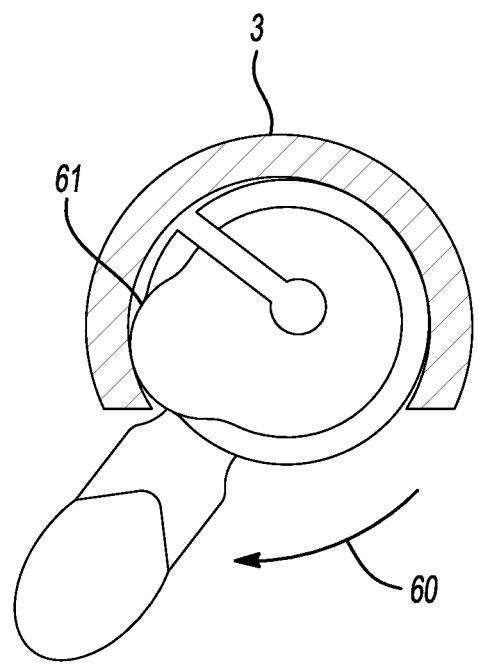

In one embodiment, the snare carriage body 24 includes an eccentric cam that, by user rotation of thumb tab 18, securely (but releasably) engages the interior diameter of the primary barrel 3 along the channel 4. This configuration enables a user to take control of a snared animal with one hand and unlock the snare carriage 13 with the other hand, releasing the animal from the snare. FIG. 5A illustrates a side view of the snare carriage 13 located slidably within channel 4 of the primary barrel 3. FIG. 5C illustrates cross-section 5B-5B of snare carriage 13 in a "locked" orientation 60 in which a cam profile 61 of the snare carriage 13 releasably interferes with the interior diameter of barrel 3. FIG. 5B illustrates cross-section 5B-5B of the snare carriage 13 in an "unlocked" orientation 62 in which the cam 61 does not interfere with the interior diameter of barrel 3. This enables the snare carriage 13 to slide within barrel 3 along channel 4. Other alternatives may be implemented for latching and releasing the snare to remove the harvested animal after catching. For example, snare carriage 13 may include a releasable detent that latches within one or more holes located along the primary barrel 3. During operation, a user may unlatch elastic band 17 after setting the cam lock so that subsequent unlocking of the cam lock will free the snare.

Referring again to FIG. 4A, barrel coupling 5 may be affixed to primary barrel 3 and rotatably coupled to secondary articulated barrel 7. A user may loosen lock screw 6 to rotate secondary articulated barrel 7 to a desired articulation relative to handle assembly 2. The user may then tighten lock screw 6 to retain secondary barrel 7 in the desired articulation relative to the handle assembly 2. Other embodiments may be implemented to releasably articulate the secondary barrel 7 in a variety of different positions. For example, detents and threaded friction couplings may also be implemented.

FIG. 6A illustrates an embodiment of the snare gun assembly 1 with a zip-tie snare loop configuration 29, as distinct from the cable snare configuration illustrated in FIG. 1. The zip-tie snare configuration in FIG. 6A includes handle assembly 2, primary barrel 3, articulating secondary barrel 7, adjustable coupling 5, zip tie nozzle 11 and zip tie loop 29. Snare gun assembly 1 is shown in the unfired or "loaded" position in which the elastic band 17 is fully stretched between coupling 5 and the firing carriage 15 latched at handle assembly 2.

Referring to FIGS. 6A, 6B, and 6C, a zip tie carriage 31 is illustrated for use with the zip-tie snare configuration illustrated in FIG. 6A. In this embodiment, zip-tie carriage 31 includes a serpentine passageway 32 through which the leading end 28 of the zip tie loop 29 is inserted by a user after the leading end 28 of the zip tie loop is passed through the zip tie nozzle 11, the secondary barrel 7 if equipped, and the primary barrel 3. The serpentine passageway 32 allows a secure attachment of the leading end 28 of the zip tie to the zip tie carriage 31. In this example, it is not necessary to relax the elastic band 17 or lock the carriage 31 within the channel 4 of the primary barrel 3 in order to release the animal from the snare. Once the user has taken control of the animal, the leading end of the zip tie 28 can be easily removed from the serpentine passageway 32 of the zip tie transfer carriage 31. The user may easily remove the zip tie snare loop 29 along with the attached animal from the snare gun 1 and install a new zip tie snare loop 29 in the manner previously described.

Figure 7:
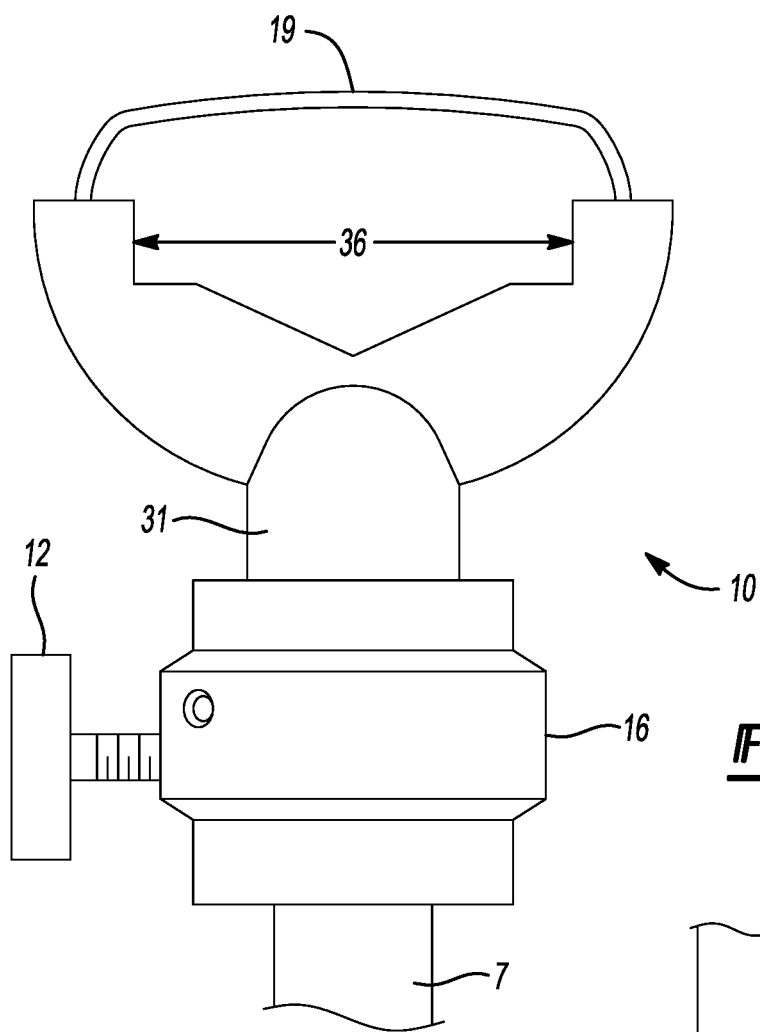
FIG. 7 illustrates an embodiment of a cable snare frame and integrated size gauge.

FIG. 7 illustrates an embodiment of the snare frame 10 for the cable snare configuration. Snare frame 10 includes a neck 31 that is rotatably coupled at coupling 16 to the secondary articulating barrel 7. A user may release lock screw 12 to rotate snare frame 10 to a desired position relative to the articulating barrel 7 and/or handle assembly 2. A user may tighten lock screw 12 to retain the snare frame 10 in its desired orientation with respect to the articulating barrel 7. Other embodiments may be implemented to releasably articulate the snare frame 10 relative to the secondary barrel 7. For example, detents and threaded friction couplings may also be implemented.

Figure 8:
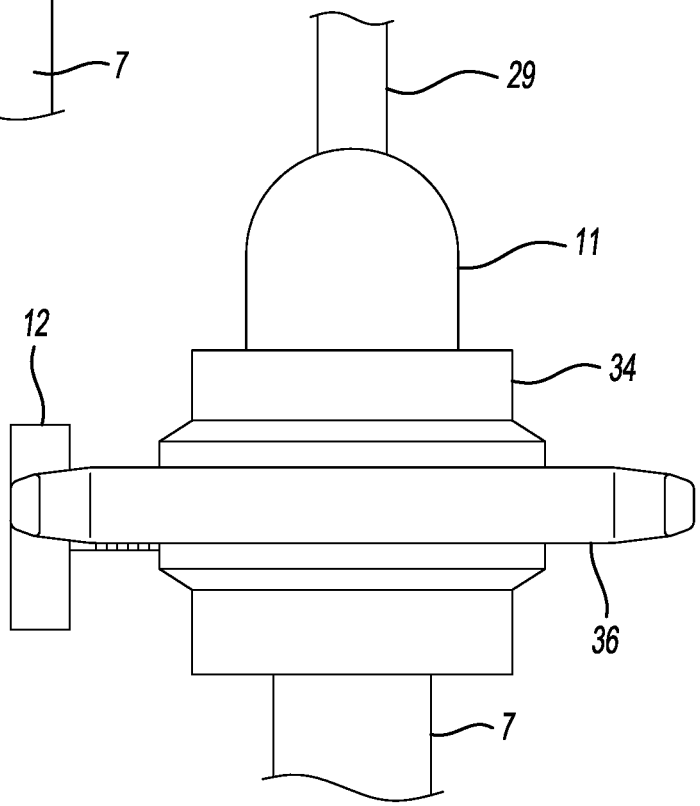
FIG. 8 illustrates an embodiment of a zip tie nozzle and integrated size gauge.

FIG. 8 illustrates an embodiment of the zip tie nozzle 11 for the zip tie snare gun configuration illustrated in FIG. 6A. Zip tie nozzle 11 is rotatably coupled at coupling 34 to the secondary articulating barrel 7. A user may release lock screw 12 to rotate zip tie nozzle 11 to a desired position relative to the articulating barrel 7 and/or handle assembly 2. A user may tighten lock screw 12 to retain the zip tie nozzle 11 in its desired orientation with respect to the articulating barrel 7. Other embodiments may be implemented to releasably articulate the zip tie nozzle 11 relative to the secondary barrel 7. For example, detents and threaded friction couplings may also be implemented.

In some embodiments, the secondary articulated barrel 7 illustrated in FIGS. 1 and 6A may be omitted from the snare gun assembly 1. In these and other embodiments, the primary barrel 3 and/or the secondary articulated barrel 7 may have a telescoping configuration for shortening or elongating the barrel length.

Referring to FIGS. 7 and 8, the snare frame 10 or zip tie nozzle 11 may include an integrated gauge 36 to allow a user to quickly determine if an animal is of legal size to harvest. In this embodiment, the gauge is set to a 3-inch width for lobster. In other configurations, the integrated gauge may define a different width depending on the applicable rules or regulations. In yet another configuration, the gauge may be of an adjustable width using a slider and lock screw or other adjustable width gauge configuration. In yet another embodiment the gauge 36 or a variation thereof may be integrated into the handle assembly 2 or attached to the barrel(s) 3 or 7.

Figure 9:
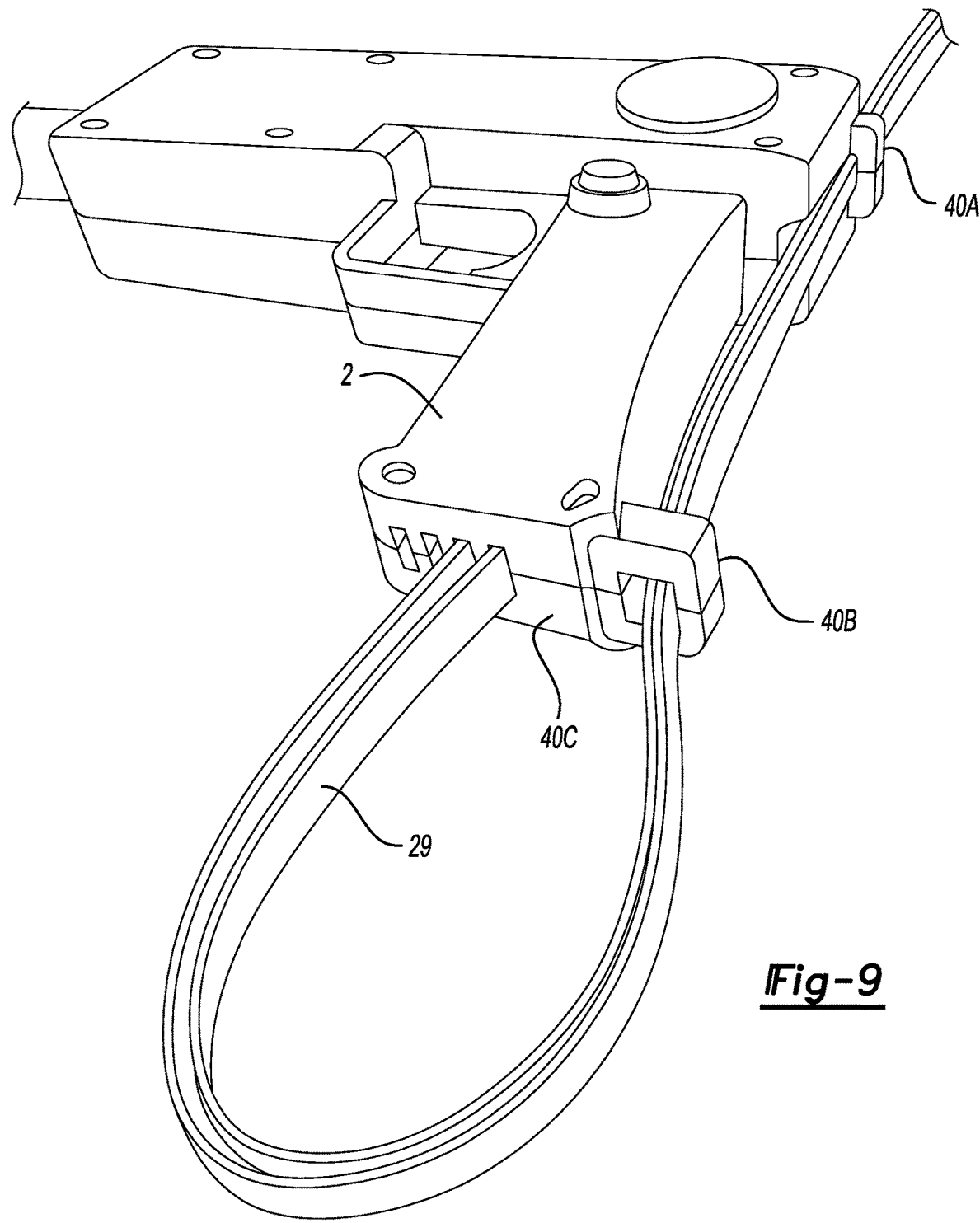
FIG. 9 illustrates an embodiment of a zip tie snare gun handle assembly including integrated retainers for extra zip tie storage.

FIG. 9 illustrates an embodiment of the handle assembly 2 including retainers 40A and 40B for removably securing extra zip ties 29. Tips of the zip ties may be inserted into cavities 40C located within the handle grip.

A variety of different material compositions may be used to construct the snare gun embodiments depicted above. Plastic, aluminum, carbon fiber, and combinations thereof, are suitable materials as they include appropriate strength-to-weight ratios for the described applications. For saltwater usages, stainless steel components are preferable for the wire snare, fasteners, pivots and other metallic components implemented in the assembly.

To prepare the snare gun for firing, a user stretches the elastic member 17 by pulling the firing carriage 15 along the primary barrel 3 until the firing carriage 15 is retained at the trigger latch 23 of the handle assembly 2. A biasing spring applies a constant rotational force to the trigger 22 causing the latching 23 arm to rotate about the trigger shaft 27 resulting in the latching arm to move upward and penetrate opening 26 in the primary barrel 3 and opening 8 in the firing carriage 15, locking it into a fixed position.

To fire the snare gun, the trigger 22 is pulled, rotating the trigger-spring assembly with latching arm 23 against the opposing force of its spring, allowing the latching arm 23 to disengage from the firing carriage 15. The firing carriage 15 is rapidly pulled forward by the stored energy in the elastic member 17, causing the snare carriage 13 (or zip tie carriage 31) to be pulled rearward by the transfer cord 25, rapidly closing the wire snare loop 19 or the zip tie loop 29. In the case of the wire snare, the snare loop is maintained in the "fired" position by the remaining tension on the elastic member 17. In the case of the zip tie snare, the snare loop is maintained in the "fired" position by the integrated latching fastener of the zip tie itself.

Figure 10:
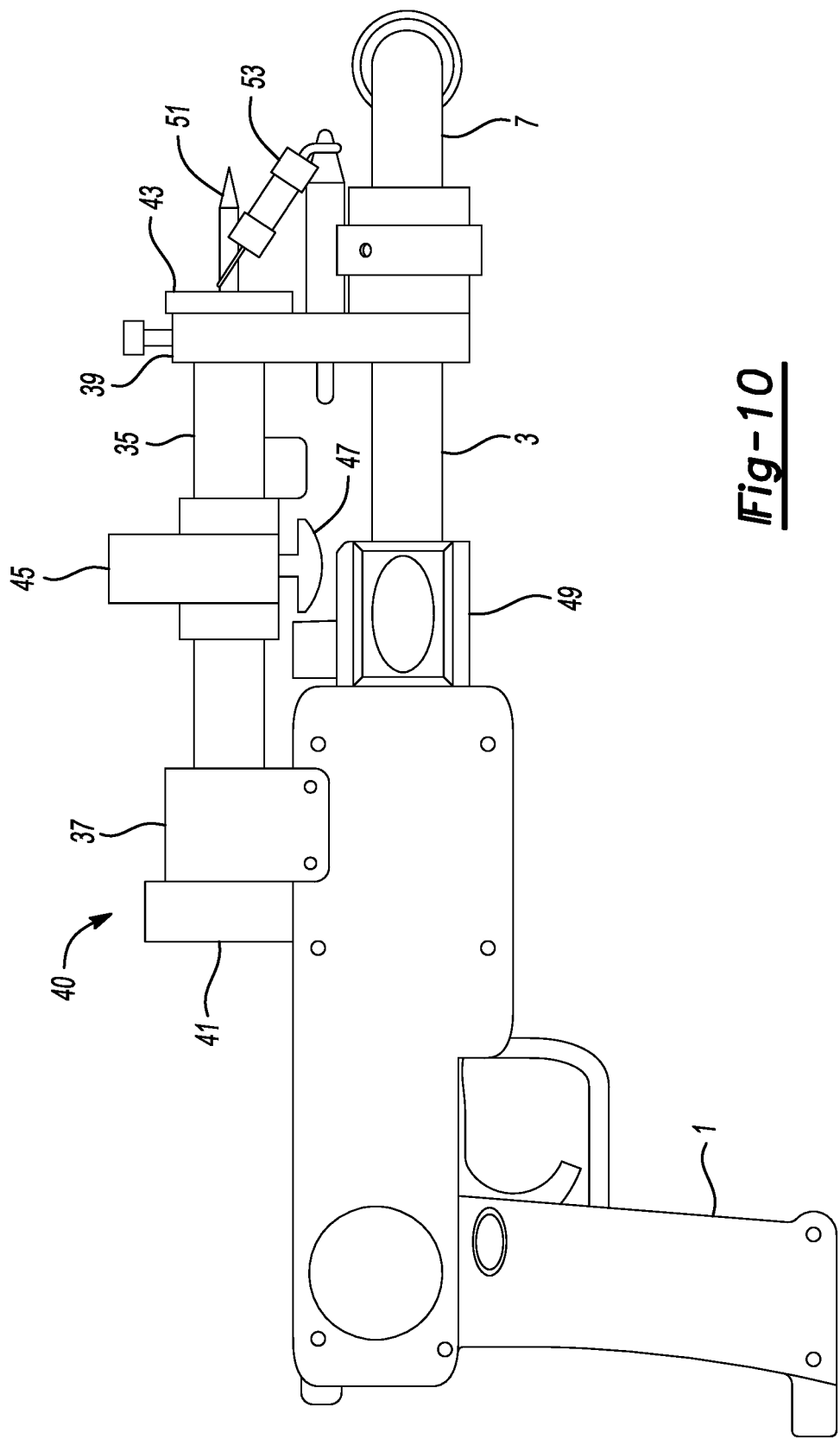
FIG. 10 illustrates an embodiment in which the snare gun assembly includes an integrated spear gun assembly.

FIG. 10 illustrates an embodiment in which the snare gun is additionally equipped with an integrated or removeable spear gun assembly 40. The top barrel 35 houses shaft or spear 51. The front end of top barrel 35 attaches to front shaft support 43 after passing through articulating anchor coupling 39. The front end of articulating anchor coupling 39 attaches to curve barrel 7. The rear end of articulating anchor coupling 39 attaches to open bottom straight barrel 3. Top barrel 35 is free to rotate in articulating anchor coupling 39.

The rear end of top barrel 35 is attached to the front end of shaft lock case 45. Selector knob 41 is attached to the rear end of shaft lock case 45 after passing through rear support 37. Rear support 37 is attached to handle assembly 2. Selector knob 41 is free to rotate within rear support 37 and is used to position top barrel 35, shaft lock case 45, and front shaft support 43 so shaft 51 can be selectively aligned to be propelled when the user activates trigger 22 of the snare gun.

Shaft 51 is propelled forward when releasable anchor 49 comes in contact with the tab affixed to the underside of shaft 51 once the user activates trigger 22 of the loaded snare gun. This will only occur when the selector knob is positioned such that the tab on shaft 51 is located on the underside of top barrel 35. The underside of top barrel 35, articulating anchor coupling 39, and front shaft support 43 are provided with a slot to allow passage for the tab of shaft 51. Selector knob 41 can be rotated 90 degrees allowing only the wire snare loop 19 to close and shaft 51 to remain in its storage location of top barrel 35.

Shaft 51 is secured in its storage location of top barrel 35 by shaft lock 47 housed within shaft lock case 45 along with spring 55. Spring 55 applies pressure on shaft lock 47 so that shaft lock 47 engages and is maintained engaged in the recessed groove of shaft 51.

Line (e.g., monofilament) equipped with shock cord 53 attaches to the tab of shaft 51 and articulating anchor coupling 39. Monofilament line equipped with shock cord 53 is routed from articulating anchor coupling 39 over the top side of shaft 51 that extends beyond front shaft support 43, rearward towards shaft lock 47, around arm of shaft lock 47 then forward towards front shaft support 43 and finally rearward to the tab of shaft 51 which protrudes from the bottom side of top barrel 35.

When trigger 22 is activated to propel shaft 51, releasable anchor 49 raises shaft lock 47 as it moves forward. This causes shaft lock 47 to disengage from the recessed groove in shaft 51 and simultaneously raises the arm of shaft lock 47 causing the monofilament line 53 to be released from shaft lock 47. Alternatively, the spear gun assembly 40 may include a separate elastic band and/or trigger assembly for propelling the spear 51 independent of the snare gun elastic band 17 and trigger assembly 27.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An animal snare comprising:
    an elongated barrel having a first end, a second end, an outer surface, and an inner surface;
    a first carriage slidably engaged on the outer surface of the barrel and configured to travel along at least a portion of the barrel between a cocked position and a fired position;
    a second carriage slidably retained within the inner surface of the barrel and configured to travel along at least a portion of the barrel;
    a pulley positioned distal to the second end of the barrel;
    a cord having a first end affixed to the first carriage, a second end affixed to the second carriage, and a portion disposed around the pulley;
    a snare extending out the first end of the barrel and having at least one end affixed to the second carriage;
    an elastic member releasably connected to the first carriage and configured to bias the first carriage toward the fired position, wherein the elastic member is in tension when the first carriage is in the cocked position; and
    a trigger assembly configured to retain the first carriage in the cocked position against the tension of the elastic member, wherein actuation of a trigger of the trigger assembly causes release of the first carriage and permits the first carriage to travel along the barrel toward the first end to the fired position as the tension in the elastic member is released.

2. The animal snare of claim 1, wherein the elastic member has a second end affixed to the barrel.

3. The animal snare of claim 2, wherein the snare is a zip tie and wherein the zip tie is releasably affixed to the second carriage.

4. The animal snare of claim 1, wherein the barrel defines an axially extending channel, and the second carriage includes a tab extending slideably through the channel, wherein the second carriage defines an eccentric cam that engages with the inner surface of the barrel when rotated by the tab to retain the second carriage at a desired axial position along the barrel.

5. The animal snare of claim 1 further comprising a handle at least a portion of which is generally orthogonal to the barrel.

6. The animal snare of claim 1 further comprising a handle attached to the second end of the barrel, wherein the trigger assembly and the pulley are supported by the handle.

7. The animal snare of claim 1 further comprising a spear gun assembly including a spear barrel, a spear disposed within the spear barrel, a second trigger, and a line connected between the spear and the animal snare, wherein the spear is projected upon activation of the second trigger.

8. An animal snare comprising:
    an elongated first barrel portion having a first end and a second end, an outer surface and an inner surface and an axis from the first end to the second end;
    a first carriage slidably engaged on the outer surface of the first barrel portion, the first carriage configured to travel along at least a portion of the first barrel axis;
    a second carriage slidably retained within the inner surface of the first barrel portion and configured to travel along at least a portion of the first barrel axis;
    a pulley;
    a cord having a first end affixed to the first carriage and a second end affixed to the second carriage wherein at least a portion of the cord is disposed around a portion of the pulley;
    a curved second barrel portion having a first end and a second end, wherein the second end of the curved second barrel portion is affixed to the first end of the elongated first barrel portion;
    a snare extending out the first end of the curved second barrel portion, the snare having at least one end affixed to the second carriage;
    an elastic member connected to the first carriage that, when stretched toward the second end of the first barrel portion, pulls the first carriage toward the first end of the first barrel portion; and
    a trigger configured to retain the first carriage along the first barrel portion with the elastic member in a stretched condition such that an activation of the trigger permits the first carriage to travel along the first barrel portion toward the first end as tension in the elastic band member is released.

9. The animal snare of claim 8, wherein the second end of the curved second barrel portion is rotatably affixed to the first end of the elongated first barrel portion, and wherein an angle formed between the first end of the curved second barrel portion and the elongated first barrel portion is 90 degrees.

10. The animal snare of claim 8 further comprising a snare frame affixed to the first end of the curved second barrel portion.

11. The animal snare of claim 8, wherein the first and second ends of the cord are terminal ends.

12. The animal snare of claim 8, wherein the snare is a zip tie.

13. The animal snare of claim 12, wherein the zip tie is releasably affixed to the second carriage.

14. The animal snare of claim 8, wherein the first barrel portion defines a channel along at least a portion of the axis, wherein the second carriage includes a tab extending slideably through the channel, and wherein a cross-section of at least a portion of the second carriage defines an eccentric cam that interferes with the inner surface of the first barrel portion when rotated by the tab to retain the second carriage at a desired position along the axis of the first barrel portion.

15. The animal snare of claim 8, wherein the elastic member has a second end affixed to the barrel.

16. The animal snare of claim 8 further comprising a handle at least a portion of which is generally orthogonal to the barrel.

17. The animal snare of claim 16, wherein the handle defines a pistol grip.

18. The animal snare of claim 8 further comprising a spear gun assembly including a spear barrel, a spear disposed within the spear barrel and a line connected between the spear and the animal snare wherein the spear is projected by the first carriage upon activation of the trigger.

19. An animal snare comprising:
- a barrel having a forward end and a rearward;
- a first carriage slidably connected to the barrel and configured to travel along at least a portion of the barrel between a rearward cocked position and a forward fired position;
- a second carriage slidably connected to the barrel and configured to travel along at least a portion of the barrel between a forward position and a rearward position;
- a pulley;
- a cord disposed around the pulley and connected between the first and second carriages such that movement of the first carriage towards the fired position moves the second carriage to the rearward position;
- a snare extending out the forward end of the barrel and having an end affixed to the second carriage, wherein the snare tightens as the second carriage moves from the forward position towards the rearward position;
- an elastic member having a first end affixed to an attachment point that is forward of the fired position and a second end affixed to the first carriage, wherein the elastic member is in tension when the first carriage is in the cocked position such that the elastic member urges the first carriage towards the fired position; and
- a trigger assembly including a trigger and a holding member configured to engage with the first carriage when the first carriage is in the cocked position and to retain the first carriage in the cocked position against the tension of the elastic member, wherein actuation of the trigger releases the holding member from the first carriage such the elastic member urges the first carriage towards the fired position, the first carriage urges the second carriage to the rearward position, and the snare is tightened automatically.

20. The animal snare of claim 19, wherein the attachment point is affixed to the barrel.

* * * * *